(12) United States Patent
Weinshanker et al.

(10) Patent No.: US 9,833,708 B2
(45) Date of Patent: Dec. 5, 2017

(54) SYSTEM AND METHOD FOR CREATING THEMED VIRTUAL REALITY ENVIRONMENTS

(75) Inventors: Joel Weinshanker, Hillside, NJ (US); Milton Soong, Los Altos, CA (US)

(73) Assignee: National Entertainment Collectibles Association, Inc., Hillside, NJ (US)

( * ) Notice: Subject to any disclaimer, the term of this patent is extended or adjusted under 35 U.S.C. 154(b) by 1172 days.

(21) Appl. No.: 13/462,206

(22) Filed: May 2, 2012

(65) Prior Publication Data

US 2013/0296043 A1 Nov. 7, 2013

(51) Int. Cl.
*A63F 9/24* (2006.01)
*A63F 13/63* (2014.01)

(52) U.S. Cl.
CPC ...... *A63F 13/63* (2014.09); *A63F 2300/5553* (2013.01); *A63F 2300/575* (2013.01); *A63F 2300/6018* (2013.01); *A63F 2300/65* (2013.01)

(58) Field of Classification Search
CPC .......... G06Q 30/00; A63F 13/00; G07F 17/32
USPC .......................................................... 463/31
See application file for complete search history.

(56) References Cited

U.S. PATENT DOCUMENTS

| | | | |
|---|---|---|---|
| 6,616,533 B1 * | 9/2003 | Rashkovskiy | ................. 463/31 |
| 7,636,900 B2 | 12/2009 | Xia | |
| 7,837,567 B2 | 11/2010 | Holzberg et al. | |
| 7,850,527 B2 | 12/2010 | Barney et al. | |
| 2007/0192203 A1 | 8/2007 | Di Stefano | |
| 2008/0163089 A1 | 7/2008 | Altieri | |
| 2011/0028207 A1 | 2/2011 | Gagner et al. | |
| 2014/0228119 A1 * | 8/2014 | Koenig | .......................... 463/32 |

OTHER PUBLICATIONS

Puzzle Fighter PS3, https://www.youtube.com/watch?v=VbyHcbNp8Qk. Created Feb 2, 2011.*
"Tutorial: How to make an "illusional" half wall as a roof," http://modthesims.info/t/373148. Created Oct. 4, 2009.*
"Maxis Outerwear." http://modthesims.info/d/222563. Created Mar. 3, 2007.*
"In-game Advertising," Wkipedia, www.wikipedia.org/wiki/In-game-advertising, accessed on Nov. 22, 2011 (8 pages).

(Continued)

*Primary Examiner* — Reginald Renwick
(74) *Attorney, Agent, or Firm* — McCarter & English, LLP (57) ABSTRACT

A system and method for creating a themed virtual environment is provided. A computer system is in communication with at least one remote user computer system, and a themed virtual environment creation module is executed by the computer system. The themed virtual environment creation module allows a user of the at least one remote computer system to: select a template virtual environment and a plurality of primitives to be placed in the virtual environment; define one or more attributes associated with the primitives; uploading indicia to be applied to the plurality of primitives; customize the plurality of primitives by applying the indicia to the primitives; and customize the template virtual environment by placing the plurality of primitives at desired locations in the template virtual environment.

38 Claims, 9 Drawing Sheets

(56) References Cited

OTHER PUBLICATIONS

Webpage for Advertisers, Zynga, http://company,zynga.com/about/advertise, accessed on Nov. 21, 2011 (1 page).
"Monopoly Streets," Electronic Arts, Inc., http:www.ea.com/monopoly-streets, accessed on Nov. 22, 2011 (6 pages).
TJ Dietsch, "Jersey Shore Virtual Boardwalk," Character Arcade, http:/theclick.characterarcade.com/game-types/jersey-shore-virtual-boardwalk.php, Jan. 20, 2010 (3 pages).
"Theme Park," Games4Win.com, http://www.games4win.com/games/theme-park/, accessed on Nov. 22, 2011 (5 pages).

* cited by examiner

SYSTEM AND METHOD FOR CREATING THEMED VIRTUAL REALITY ENVIRONMENTS

BACKGROUND OF THE INVENTION

Field of the Invention

The present invention relates generally to virtual reality environments. More specifically, the present invention relates to a system and method for creating themed virtual reality environments, such as themed virtual games, activities, etc.

Related Art

Virtual reality environments are computer-generated environments that allow users to engage in one or more virtual activities. Virtual reality environments such as Second Life allow users to participate in virtual activities, games, etc., using avatars that can be customized by the user. Often, virtual reality environments allow users to purchase virtual goods and/or services using virtual currency, which can be exchanged with real currency.

It is known in the art to allow users to customize various aspects of virtual reality environments, such as objects that appear in the virtual reality environments and/or various attributes associated with such objects. Further, existing virtual reality environments allow users to create "avatars" that appear in the virtual reality environment and various features/attributes associated with such avatars. Users of such environments can thus customize virtual reality environments and avatars associated therewith.

SUMMARY OF THE INVENTION

The present invention relates to a system for creating a themed virtual environment. The system includes a computer system in communication with at least one remote user computer system, and a themed virtual environment creation module executed by the computer system. The themed virtual environment creation module allows a user of the at least one remote computer system to: select a template virtual environment and a plurality of primitives to be placed in the virtual environment; define one or more attributes associated with the primitives; upload indicia to be applied to the plurality of primitives; customize the plurality of primitives by applying the indicia to the primitives; and customize the template virtual environment by placing the plurality of primitives at desired locations in the template virtual environment.

In another embodiment, the present invention provides a method for creating a themed virtual environment, comprising the steps of: selecting a template virtual environment and a plurality of primitives to be placed in the virtual environment using a computer system; defining one or more attributes associated with the primitives using the computer system; upload indicia to be applied to the plurality of primitives using the computer system; customizing the plurality of primitives by applying the indicia to the primitives using the computer system; and customizing the template virtual environment by placing the plurality of primitives at desired locations in the template virtual environment using the computer system.

In another embodiment, the present invention provides a non-transitory, computer readable medium having computer-readable instructions stored therein which, when executed by a computer system, cause the computer system to execute a method for creating a themed virtual environment comprising the steps of: selecting a template virtual environment and a plurality of primitives to be placed in the virtual environment using a computer system; defining one or more attributes associated with the primitives using the computer system; uploadingx indicia to be applied to the plurality of primitives using the computer system; customizing the plurality of primitives by applying the indicia to the primitives using the computer system; and customizing the template virtual environment by placing the plurality of primitives at desired locations in the template virtual environment using the computer system.

In another embodiment, the present invention relates to a method for creating a plurality of themed virtual environments, comprising the steps of: selecting a template virtual environment using a computer system; allowing a client to upload indicia to the computer system; creating a plurality of virtual environments using the template virtual environment, the plurality of virtual environments having the same physical structure; and applying the indicia to the plurality of virtual environments using the computer system.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for creating themed virtual environments, as discussed in detail below in connection with FIGS. 1-10. By the term "primitive" it is meant a pre-defined virtual object such as a virtual house, virtual building, virtual carnival, virtual boardwalk storefront, or other object which can be conveniently selected by the user and customized as described herein.

Figure 1:
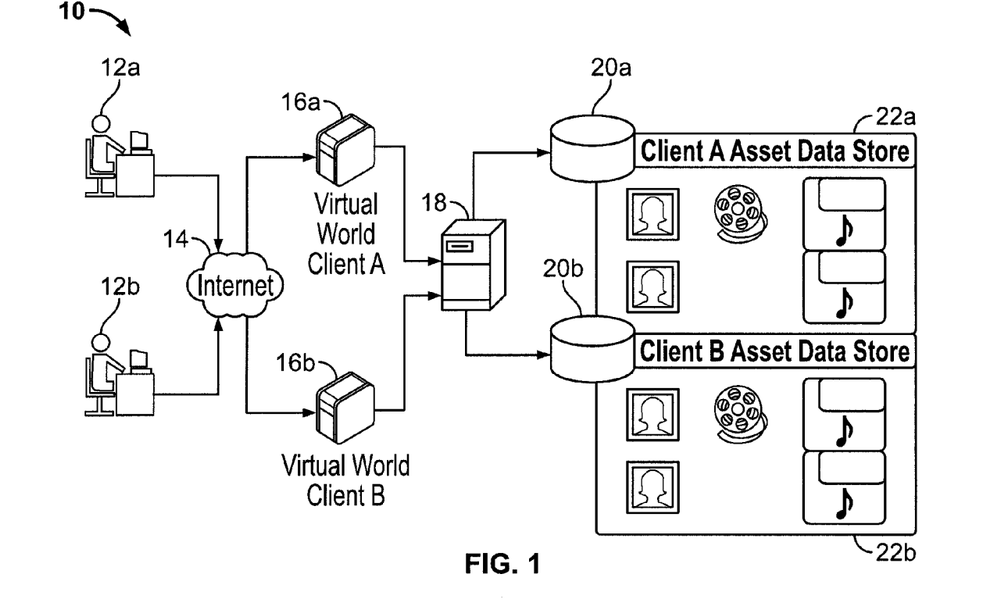
FIG. 1 is a diagram illustrating hardware and software components of the system.

FIG. 1 is a diagram illustrating hardware and software components of the system 10. The system 10 allows a plurality of clients or other entities 12a-12b to create customized, themed virtual environments. The clients 12a-12b communicate with one or more virtual world servers 16a-16b via a network 14 which could include the Internet, a local area network (LAN), a wide area network (WAN), a cellular data network, etc. The clients 12a-12b can access the system 10 using a variety of local computer systems, including, but not limited to, local personal computers (PCs), tablet computers (e.g., APPLE IPAD, etc.), smart cellular phones (e.g., APPLE IPHONE, etc.), laptop computers, etc.

As will be discussed in greater detail below, the servers 16a-16b generate development environments which allow the clients 12a-12b to easily create customized, themed virtual environments. Once created, the environments are hosted by the servers 16a-16b and can be accessed by any users such as individuals wishing to play one or more virtual games in the themed virtual environments. For example, the server 16a could host a first themed virtual environment (or, "world") for a first client (Client A), and the server 16b could host a second themed virtual environment (or, "world") for a second client (Client B). Of course, the servers 16a-16b could be combined into a single server that hosts multiple themed virtual environments for multiple clients/users. The servers 16a-16b could be supported by any suitable computer hardware, software, and operating systems, e.g., single- or multiple-core microprocessors by INTEL or other suitable manufacturer and associated operating system software such as WINDOWS SERVER, MACOS, SOLARIS, UNIX, LINUX, etc.

The servers 16a, 16b communicate with a virtual world data store server 18 that stores a plurality of virtual "assets" and/or primitives designed by or chosen by the clients 12a, 12b of the system. As will be discussed in greater detail below, each of these assets/primitives could be themed by the clients by applying indicia to the primitives as desired. For example, a client company could create a themed virtual environment that is themed according to the company's branding strategy. Each virtual asset of primitive created in the virtual environment could be customized so that the asset displays a company logo or other indicia. Other components of the virtual environment, such as floors, surfaces, etc., could also be themed in this manner. Similarly, the client could be an individual or other entity and the environment can be themed according to the client's wishes. It is also noted that the clients 12a, 12b can upload a plurality of logos to the system, can choose a color combination, and the system can automatically create and arrange customized primitives with the uploaded logos and/or color combination applied thereto.

The server 18 could host one or more databases 20a-20b which serve as virtual asset data stores 22a-22b for storing virtual assets/primitives. The data stores 22a-22b could be organized according to clients, e.g., the data store 22a could store virtual assets/primitives for a first client (Client A), and the data store 22b could store virtual assets/primitives for a second client (Client B). Of course, a single database and associated data stores could be provided, if desired. The databases 20a-20b could be supported by an suitable database management system software, such as MySQL, MICROSOFT SQL SERVER, etc.

Figure 2:
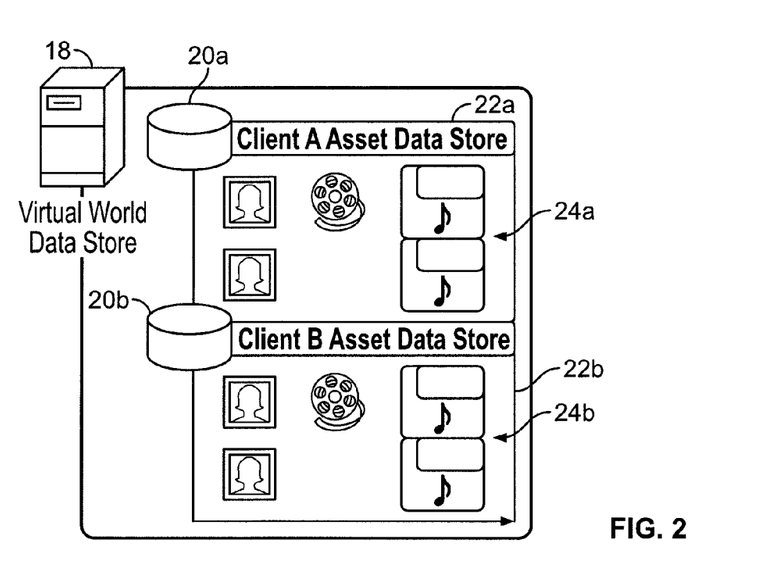
FIG. 2 is a diagram illustrating database and software components of the themed virtual environment data store server 18 of FIG. 1.

FIG. 2 is a diagram illustrating database and software components of the themed virtual environment data store server 18 of FIG. 1. As mentioned above, the data store server 18 could include databases 20a-20b which function as virtual asset/primitive data stores 22a-22b. As shown in FIG. 2, users of the system can also upload one or more multimedia files/objects 24a-24b, for use in the virtual environments. Such multimedia files/objects could include, but are not limited to, graphics files (e.g., JPEG, bitmap, TIFF, etc.), sound files (e.g., MP3, WAV, etc.), video files (e.g., MPEG, WMV, etc.). The multimedia files/objects 24a-24b could be used to customize a themed virtual environment, if desired. For example, an uploaded graphics file could be used to customize multiple virtual objects/primitives so that the graphics file (containing a company logo, for example) is applied to and displayed by the virtual objects/primitives, thus creating a themed virtual environment.

Figure 3:
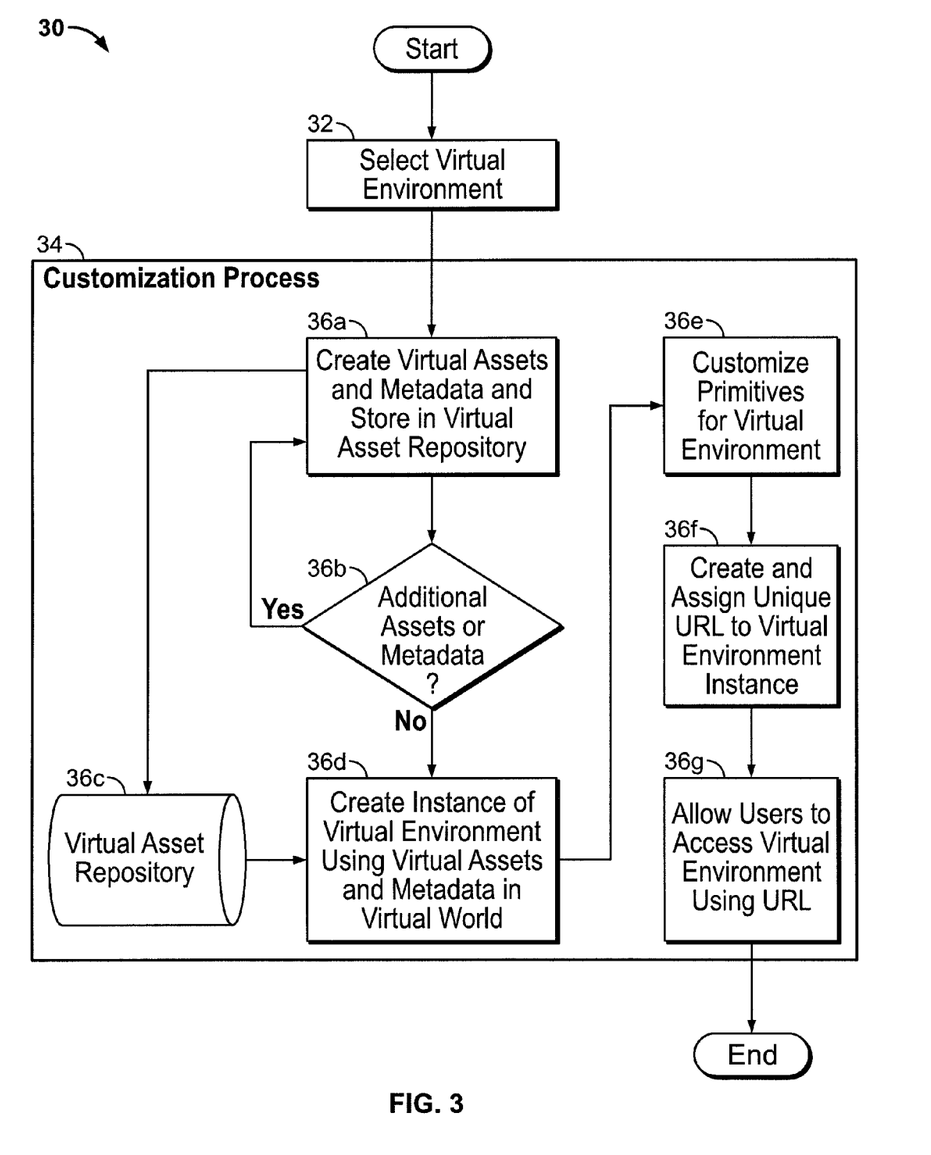
FIG. 3 is a flowchart illustrating processing steps carried out by the system for creating a customized, themed virtual environment.

FIG. 3 is a flowchart illustrating processing steps 30 carried out by the system for creating a customized, themed virtual environment. Beginning in step 32, a virtual environment "template" is selected. For example, the system could provide a client with a variety of different virtual environments (e.g., an environment containing virtual games, an environment containing other virtual activities, etc.), from which the client can select a desired template environment for customization. Further, the system could automatically provide the client with a standard virtual environment to be customized by the client, e.g., a template environment such as a virtual boardwalk, a virtual carnival, a virtual town fair, etc. In step 34, after a virtual environment has been identified, a customization process is executed, wherein the user can customize the virtual environment. In step 36a, virtual assets (e.g., primitives) are created as well as associated metadata, and are stored in a virtual asset repository 36c, e.g., in one or more of the data stores 22a-22b of FIGS. 1-2. In step 36b, a decision is made as to whether additional assets or metadata are to be created. If so, step 36a occurs. Otherwise, in step 36d, an instance of the virtual environment is created using the selected template virtual environment and the virtual assets and metadata. Then, in step 36e, the system allows the client to customize the primitives, e.g., by applying uploaded indicia (e.g., logos) to the primitives and to position the primitives at desired locations in the virtual environment. Next, in step 36f, a unique uniform resource locator (URL, e.g., web browser address) is created and assigned to the instance of the virtual environment. Then, in step 36g, users are allowed to access the virtual environment using the unique URL.

Figure 4:
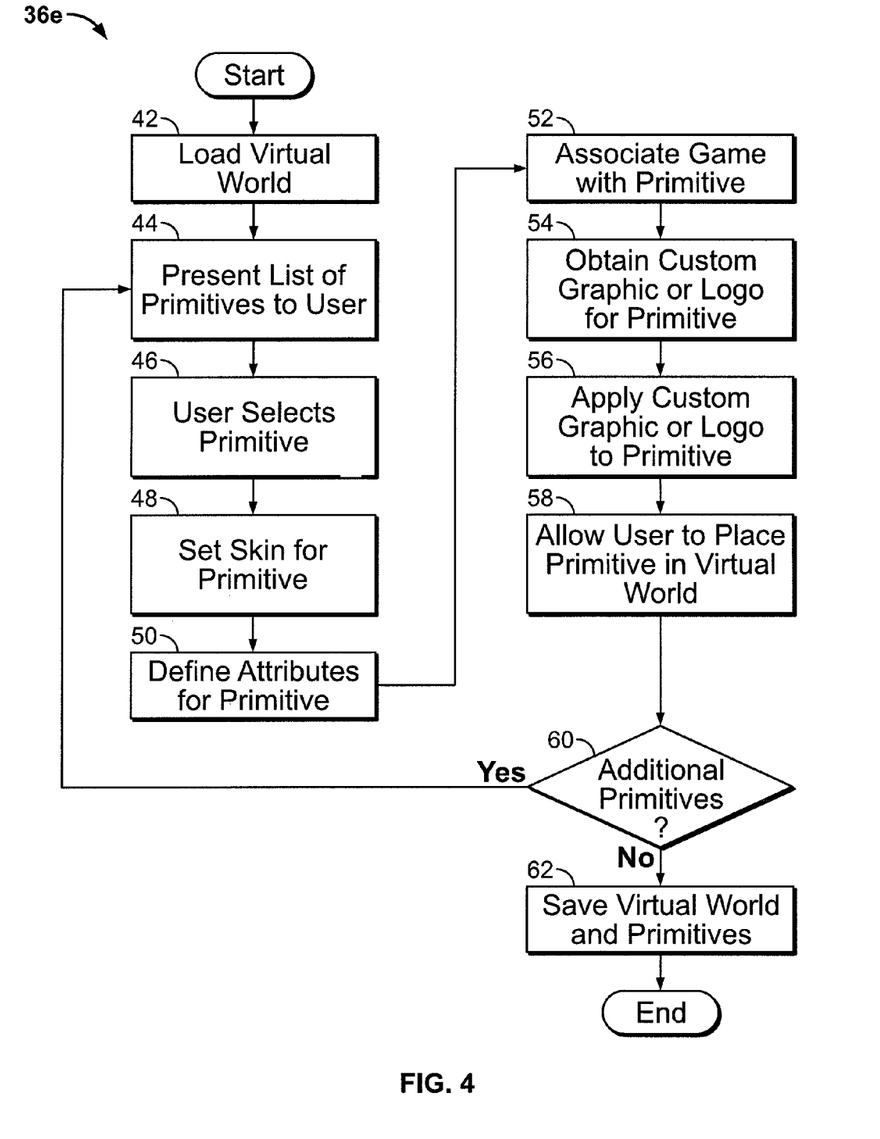
FIG. 4 is a flowchart illustrating, in greater detail, processing steps carried out by the system for creating a customized, themed virtual environment.

FIG. 4 is a flowchart illustrating, in greater detail, processing steps 36g of FIG. 3. In step 42, a virtual world/environment is loaded by the system. The loaded virtual world includes no primitives, but rather, provides an empty environment that can be customized by the client by adding one or more primitives to the environment. In step 44, the client is presented with an assortment of primitives in the form of a list, or otherwise. In step 46, the system allows a user to select a primitive from the list of primitives. Then, in step 48, the client can set a "skin" or exterior surface for the primitive. For example, the client could select a virtual brick façade to be applied to the primitive (if the primitive is a building, for example), or other exterior surface. In step 50, the system allows a client to define one or more attributes associated with the primitive, such as its size, the type and/or number of users permitted to access the primitive, etc.

In step 52, the system allows a client to associate a game with the primitive, if desired. For example, if the primitive is a virtual boardwalk storefront, the client can associate a game with the storefront, such as a balloon-popping game, wheel of chance game, etc. In step 54, the system obtains a custom graphic or logo (indicia) to be applied to the primitive. For example, the graphic or logo could be a company logo or other indicia to be applied to one or more surfaces of the primitive. In step 56, once the graphic or logo has been obtained, the system applies same to the primitive. In step 58, the system allows the client to place the primitive at a desired location in the virtual world. Then, in step 60, a determination is made as to whether additional primitives are to be created and placed into the virtual world. If a positive determination is made, control returns to step 44. If a negative determination is made, step 62 occurs, wherein the virtual world and associated primitives are saved.

It is noted that the process steps 40 could be altered so that the system automatically applies a custom graphic or logo to a plurality of primitives that are made available to the client, so that the client does not have to individually customize each primitive. Indeed, by simply uploading a graphic or logo, the client can automatically be provided with an array of pre-customized primitives that can be used to create a customized virtual environment.

Figure 5:
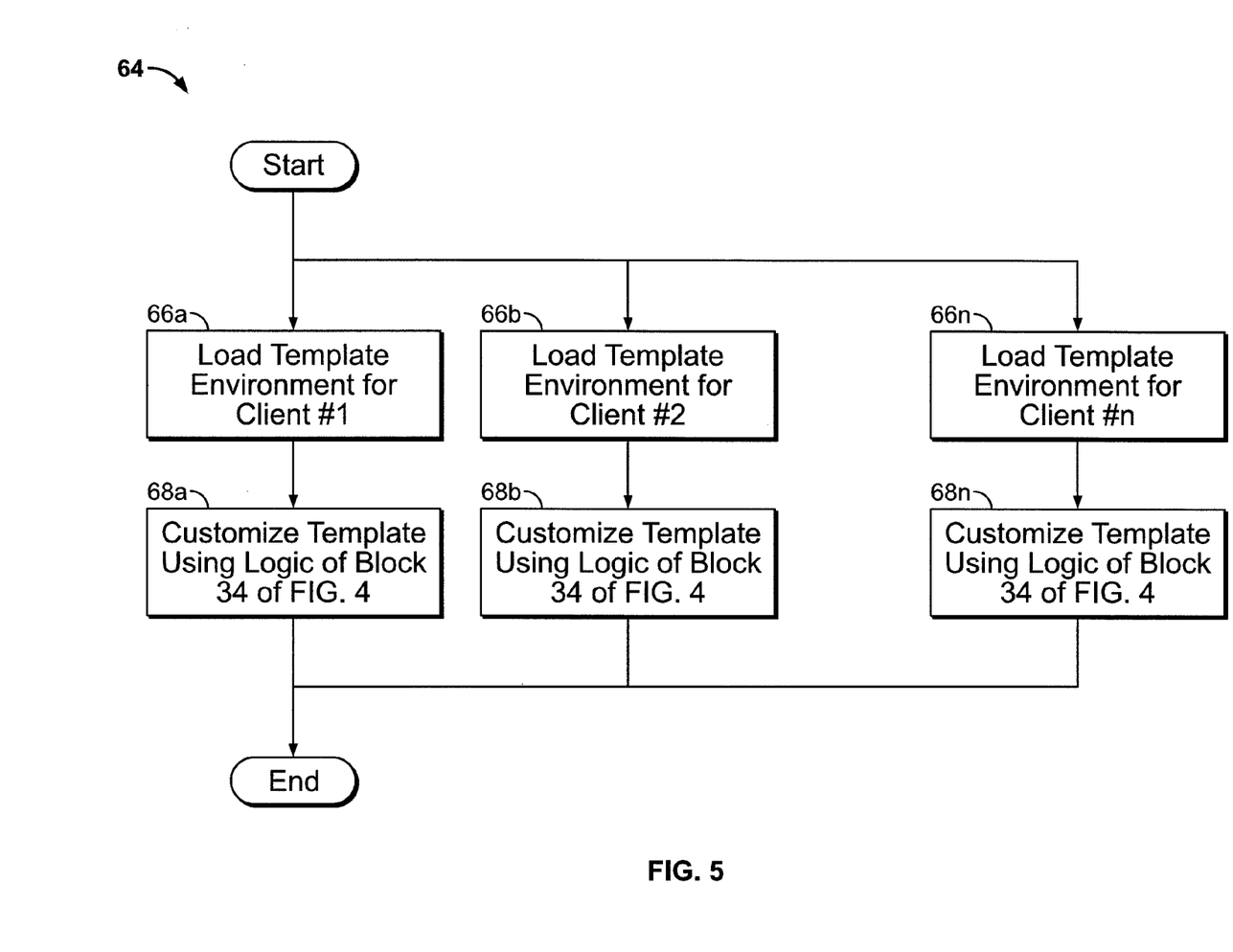
FIG. 5 is a flowchart illustrating processing steps carried out by the system for creating multiple, themed virtual environments.

FIG. 5 is a flowchart illustrating processing steps 64 carried out by the system for creating multiple, themed virtual environments. As mentioned above, the system permits a client to create a customized virtual environment using a template virtual environment as a starting point. Such customization can be extended so that the system permits multiple themed virtual environments to be created (e.g., for multiple clients/customers) using one or more common templates. Thus, as shown in FIG. 5, in steps 66a-66n, the system loads one or more template environments for clients 1 through n, n being any number. Then, in steps 68a-68n, the system allows the clients to customize the template(s) using the logic of block 34 of FIG. 3 steps 40 of FIG. 4. Also, the system could automatically customize the one or more template environments for use by multiple clients, such that no involvement is needed on the part of the clients to create the customized environments.

Figure 6:
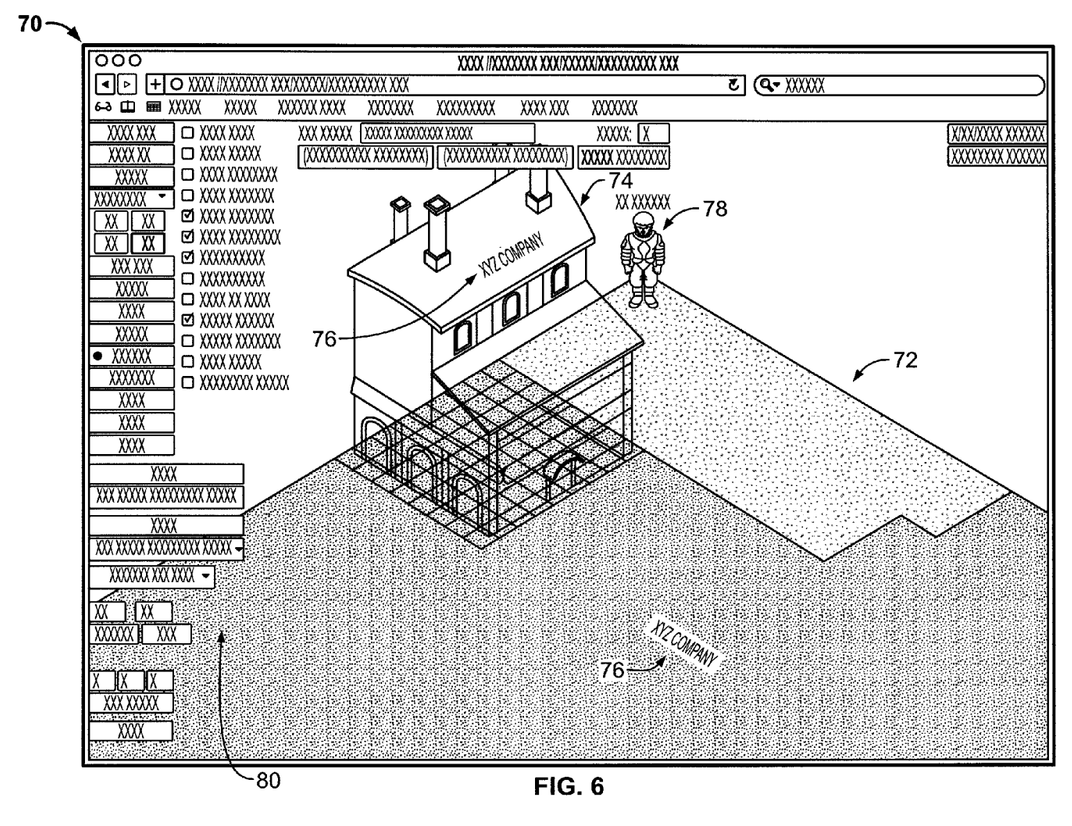
FIG. 6 is a screenshot illustrating a graphical user interface generated by the system for allowing a user to create a customized, themed virtual environment using one or more themed primitives.

FIG. 6 is a screenshot illustrating a graphical user interface 70 generated by the system for allowing a client to create a customized, themed virtual environment using one or more themed primitives. As shown in FIG. 6, the interface 70 provides the client with an empty (template) virtual environment 72. The client selects one or more primitives 74 for placement at desired locations in the virtual environment 72, e.g., by clicking and dragging the primitive 74 to a desired location in the environment 72. As shown, the primitive 74 is a building, but of course, the primitive 74 could be any desired type of object. The interface 70 allows the client to customize the primitive 74 and the environment 72 by applying a custom logo 76 (e.g., "XYZ Company") thereto. The logo 76 could be uploaded to the system by the client. As can be appreciated, the orientation and location of the logo 76 could be varied as desired. The client can also create an avatar 78 for use in the environment 72. The avatar 78 can be customized as desired, as described in further detail below. The interface 70 also provides a plurality of controls 80 for controlling one or more attributes of the interface 70, the environment 72, and/or other objects. For example, using the controls 80, the user can specify grid attributes, location and orientation of objects in the environment 72, display maps, define paths in the virtual environment 72, identify "actors" in the environment 72, and other parameters. The environment 70 could be accessed via a conventional web browser, and could be programmed in the ADOBE FLASH programming language.

Figure 7:
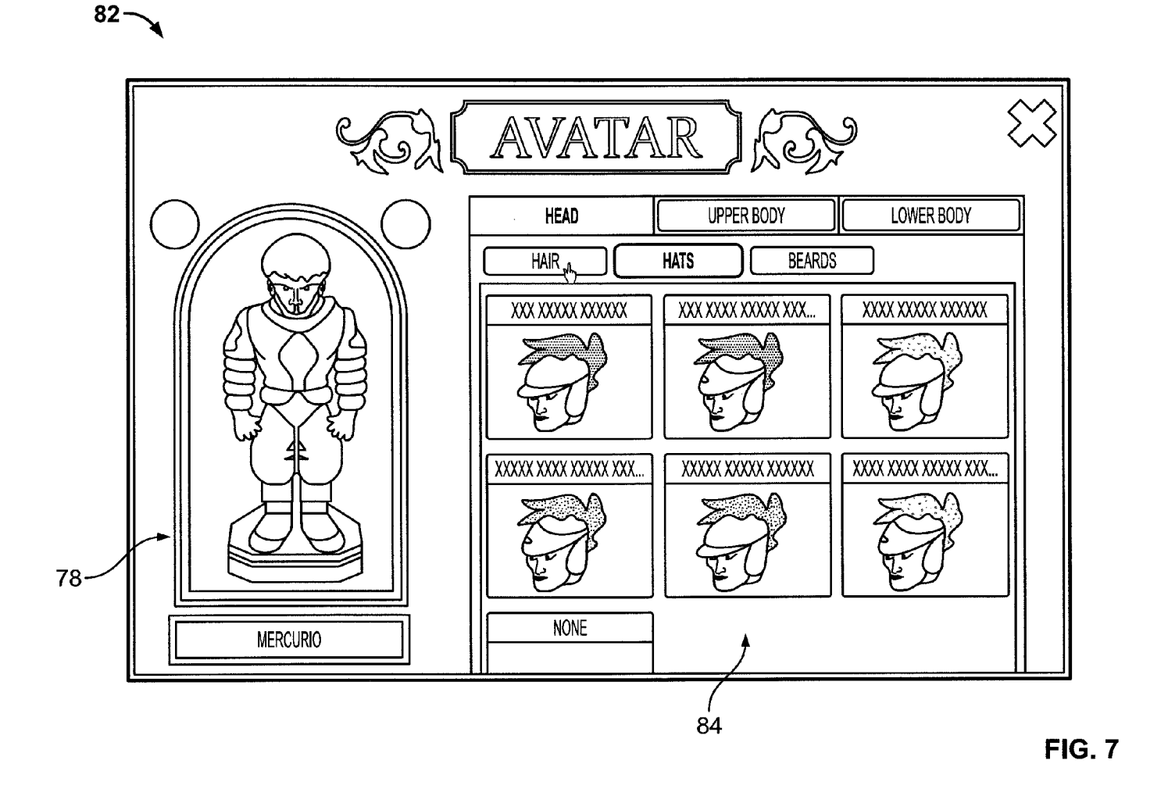
FIG. 7 is a screenshot illustrating a graphical user interface screen generated by the system for allowing a user to create a customized avatar for use in a themed virtual environment.

FIG. 7 is a screenshot illustrating a graphical user interface screen 82 generated by the system for allowing a user to create a customized avatar for use in a themed virtual environment. Various attributes of the avatar 78 can be defined using controls 84, such as hair style/color, hats beards, and other attributes relating to the avatar's upper and lower body.

Figure 8:
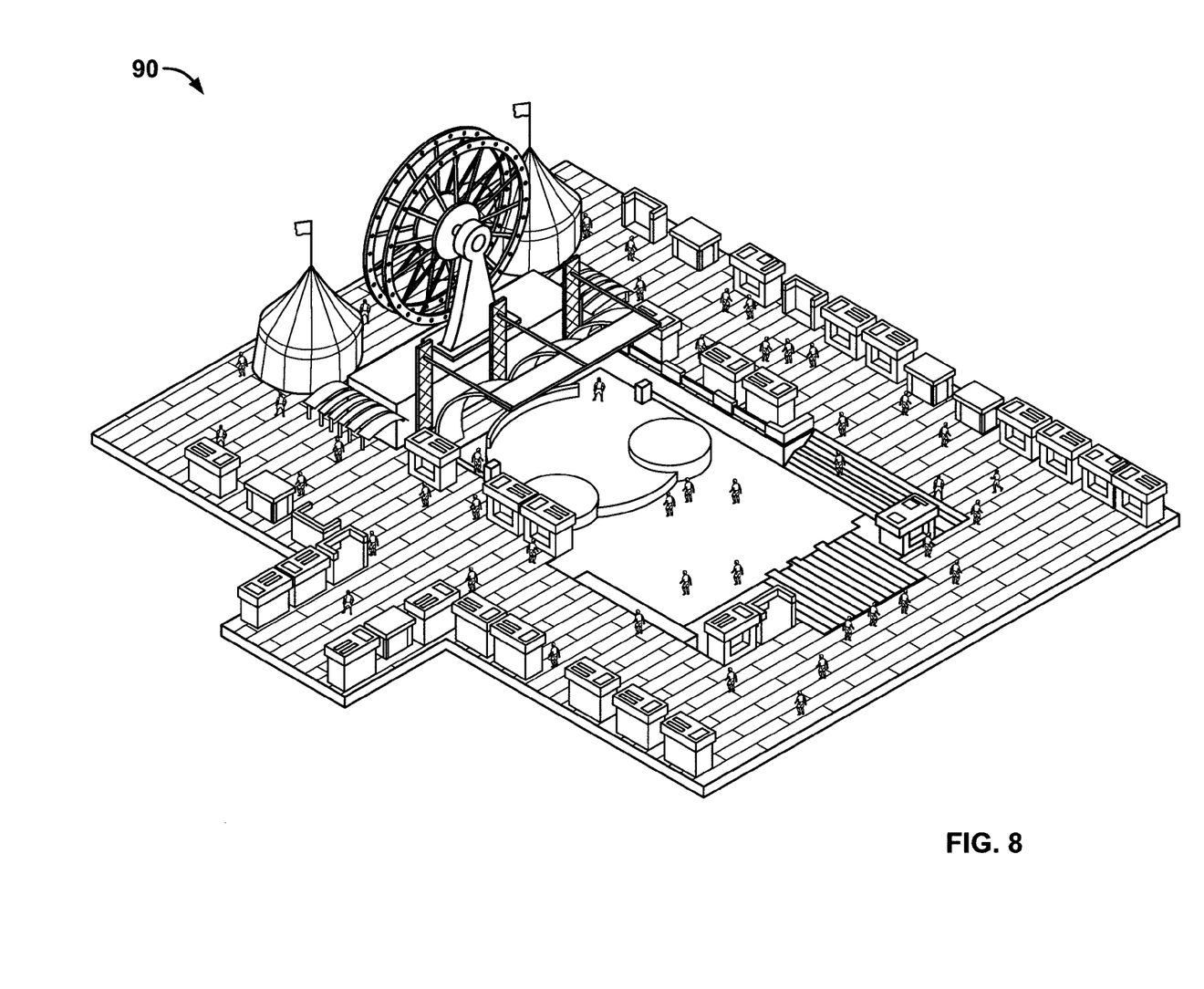
FIG. 8 is a screenshot illustrating a themed virtual boardwalk environment capable of being generated by the system.

FIG. 8 is a screenshot illustrating a themed virtual boardwalk environment 90 capable of being generated by the system. As can be seen, the virtual boardwalk environment 90 includes a plurality of storefronts/activities, each of which can be customized in appearance in accordance with the present invention. For example, the "XYZ Company" logo 76 shown in FIG. 6 could be applied to each storefront/activity, so that the entire boardwalk environment 90 is customized/themed in this manner. Multiple players/avatars can access the environment 90, as shown. Rides and/or other activities can be provided in the environment 90, as shown.

Figure 9:
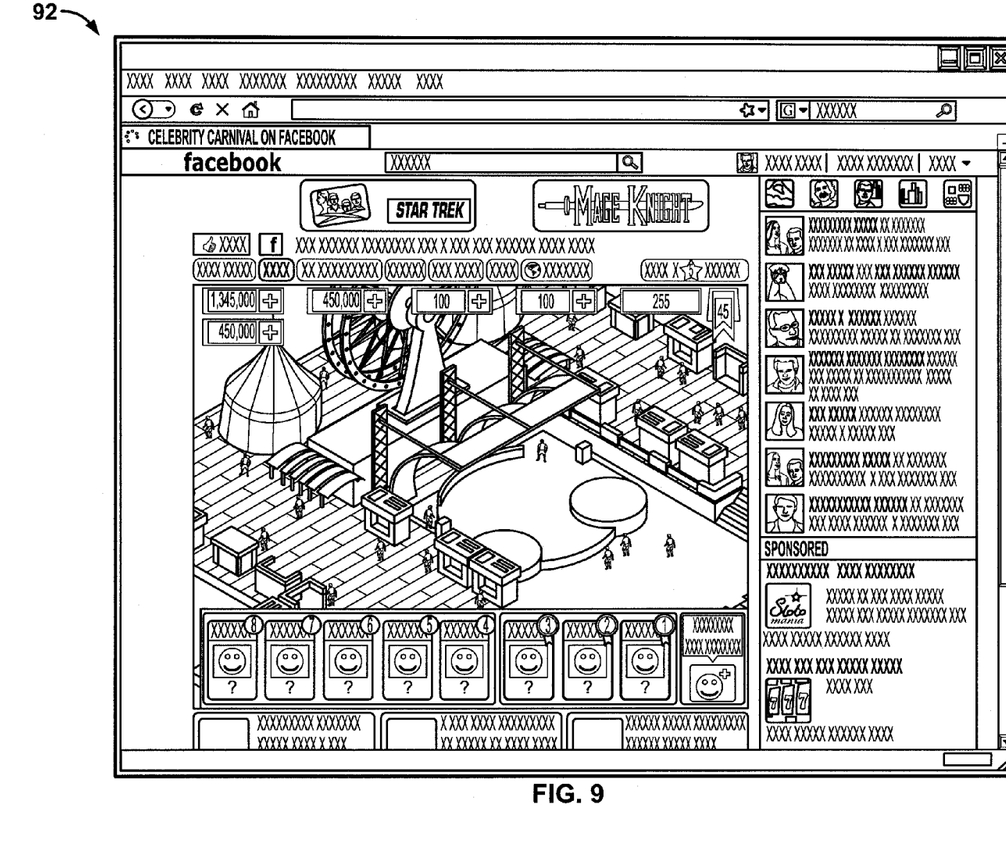
FIG. 9 is a screenshot illustrating a themed virtual boardwalk environment generated by the present invention within a web-based, social networking environment.

FIG. 9 is a screenshot illustrating a themed virtual boardwalk environment generated by the present invention within, a web-based, social networking environment 92. The virtual boardwalk environment could be accessible, for example, using FACEBOOK or other type of social networking environment, and a user's social networking "friends" can access the virtual boardwalk environment. Indeed, as shown, the environment could include the ability to allow a social networking user to challenge one or more friends (e.g., other social networking users) using one or more of the activities of the virtual boardwalk environment. As discussed above, the virtual boardwalk can be customized/themed as discussed herein.

Figure 10:
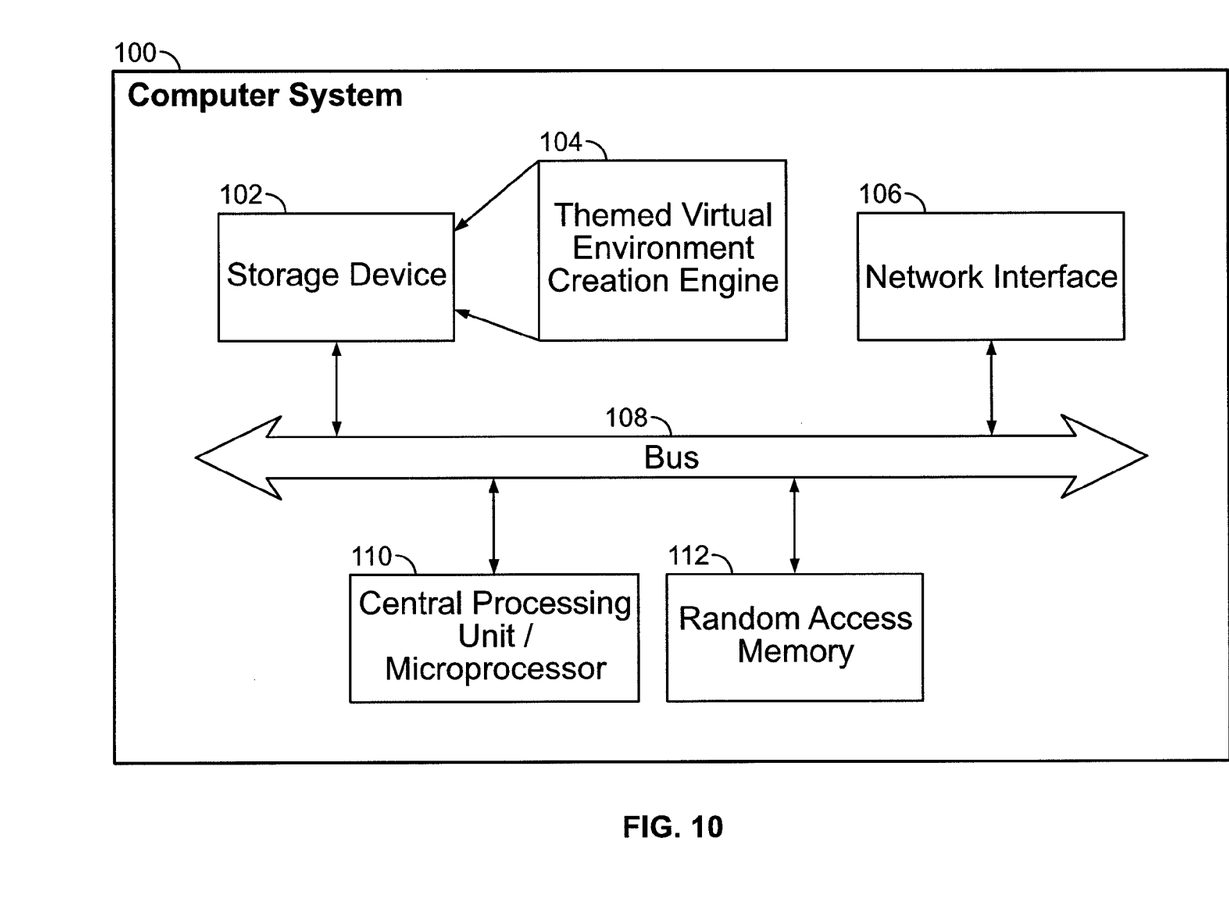
FIG. 10 is a diagram showing components of a sample computer system in which the present invention could be implemented.

FIG. 10 is a diagram showing components of a sample computer system in which the present invention could be implemented, indicated generally at 100. The computer system 100 could include, but is not limited to, the computer systems 16a-16b and 18. The present invention could be embodied as a themed virtual environment creation engine (or, software module) 104 that can be stored in a non-transitory, computer-readable storage media such as a storage device 102 of the computer system 100. The storage device 102 could include a disk drive, non-volatile memory (e.g., flash memory; electrically-erasable, programmable, read-only memory (EEPROM), etc.), or other type of storage device. The computer system 100 could further include a network interface 106 (e.g., a wireless transceiver, Ethernet transceiver, etc.) for allowing the computer system 100 to communicate with a network (e.g., the network 14 of FIG. 1), a bus 108 for permitting communication between the various components of the computer system 100, a central processing unit (e.g., microprocessor) 110, and a random access memory 112. The themed virtual environment creation engine 104 could provide the functions discussed herein, and could be coded in any suitable high- or low-level computer programming language (e.g., ADOBE FLASH, etc.).

Having thus described the invention in detail, it is to be understood that the foregoing description is not intended to limit the spirit or scope thereof. What is desired to be protected is set forth in the following claims.

What is claimed is:

1. A system for creating a themed virtual environment, comprising:
   a computer system in communication with at least one remote user computer system; and
   a themed virtual environment creation module executed by the computer system, the themed virtual environment creation module allowing a client of the at least one remote computer system to: select a template virtual environment and a plurality of primitives to be placed in the virtual environment; define one or more attributes associated with the primitives; upload indicia to be applied to the plurality of primitives; customize the plurality of primitives by applying the indicia to the primitives; interact with a user interface tool to specify grid attributes, display maps, and define paths; and customize the template virtual environment by placing the plurality of primitives at desired locations in the template virtual environment, wherein the virtual environment simulates a real-world environment wherein the virtual environment is accessible by a separate social media networking environment and wherein the virtual environment is presented to a user of the separate social media networking environment within at least a portion of a user interface of the separate social media networking environment.

2. The system of claim 1, wherein the indicia comprises a company name or company logo, and the company name or company logo is applied to the plurality of primitives by the themed virtual environment creation module.

3. The system of claim 1, wherein the themed virtual environment creation module allows a client to identify one or more games associated with the plurality of primitives.

4. The system of claim 1, wherein the themed virtual environment creation module allows a client to customize the template virtual environment by applying the indicia to the virtual environment.

5. The system of claim 1, wherein the themed virtual environment creation module allows a user to identify one or more avatars for use in the virtual environment and to customize one or more attributes associated with the one or more avatars.

6. The system of claim 1, wherein the indicia is uploaded to the computer system by a user.

7. The system of claim 1, wherein the themed virtual environment creation module allows users to create multiple, customized virtual environments using the template virtual environment.

8. A method for creating a themed virtual environment, comprising the steps of:
   selecting a template virtual environment and a plurality of primitives to be placed in the virtual environment using a computer system;
   defining one or more attributes associated with the primitives using the computer system;
   uploading indicia to be applied to the plurality of primitives using the computer system;
   customizing the plurality of primitives by applying the indicia to the primitives using the computer system;
   interacting with a user interface tool to specify grid attributes, display maps, and define paths; and
   customizing the template virtual environment by placing the plurality of primitives at desired locations in the template virtual environment using the computer system, the virtual environment simulating a real-world environment;
   allowing the virtual environment to be accessible by a separate social media networking environment and presenting the virtual environment to a user of the separate social media networking environment within at least a portion of a user interface of the separate social media networking environment.

9. The method of claim 8, wherein the step of customizing the plurality of primitives further comprises applying a company name or a company logo to the plurality of primitives.

10. The method of claim 8, further comprising allowing a user to identify one or more games associated with the plurality of primitives.

11. The method of claim 8, further comprising allowing a user to customize the template virtual environment by applying the indicia to the virtual environment.

12. The method of claim 8, further comprising allowing a user to identify one or more avatars for use in the virtual environment and to customize one or more attributes associated with the one or more avatars.

13. The method of claim 8, further comprising allowing a user to upload the indicia to the computer system.

14. The method of claim 8, further comprising allowing users to create multiple, customized virtual environments using the template virtual environment.

15. A non-transitory, computer readable medium having computer-readable instructions stored therein which, when executed by a computer system, cause the computer system to execute a method for creating a themed virtual environment comprising the steps of:
   selecting a template virtual environment and a plurality of primitives to be placed in the virtual environment using a computer system;
   defining one or more attributes associated with the primitives using the computer system;
   uploading indicia to be applied to the plurality of primitives using the computer system;
   customizing the plurality of primitives by applying the indicia to the primitives using the computer system;
   interacting with a user interface tool to specify grid attributes, display maps, and define paths; and
   customizing the template virtual environment by placing the plurality of primitives at desired locations in the template virtual environment using the computer system, the virtual environment simulating a real-world environment;
   allowing the virtual environment to be accessible by a separate social media networking environment and presenting the virtual environment to a user of the separate social media networking environment within at least a portion of a user interface of the separate social media networking environment.

16. The computer-readable medium of claim 15, further comprising instructions for causing the computer system to execute the step of customizing the plurality of primitives by applying a company name or a company logo to the plurality of primitives.

17. The computer-readable medium of claim 15, further comprising instructions for causing the computer system to execute the step of allowing a user to identify one or more games associated with the plurality of primitives.

18. The computer-readable medium of claim 15, further comprising instructions for causing the computer system to execute the step of allowing a user to customize the template virtual environment by applying the indicia to the virtual environment.

19. The computer-readable medium of claim 15, further comprising instructions for causing the computer system to execute the step of allowing a user to identify one or more avatars for use in the virtual environment and to customize one or more attributes associated with the one or more avatars.

20. The computer-readable medium of claim 15, further comprising instructions for causing the computer system to execute the step of allowing a user to upload the indicia to the computer system.

21. The computer-readable medium of claim 15, further comprising instructions for causing the computer system to execute the step of allowing users to create multiple, customized virtual environments using the template virtual environment.

22. A method for creating a plurality of themed virtual environments, comprising the steps of:
selecting a template virtual environment and a plurality of primitives using a computer system;
customizing the template virtual environment by placing the plurality of primitives at desired locations in the template virtual environment;
allowing a client to upload indicia to the computer system;
creating a plurality of virtual environments using the template virtual environment, the plurality of virtual environments having the same physical structure and simulating a real-world environment;
interacting with a user interface tool to specify grid attributes, display maps, and define paths; and
applying the indicia to the plurality of virtual environments using the computer system;
wherein the indicia can be applied in any orientation in the plurality of virtual environments.

23. The method of claim 22, wherein the step of allowing a client to upload indicia comprises allowing the client upload a company logo to the computer system.

24. The method of claim 23, wherein the step of applying the indicia to the plurality of virtual environments comprises applying the company logo to the plurality of virtual environments.

25. The system of claim 1, wherein the real-world environment is a carnival.

26. The system of claim 1, wherein the real-world environment is a boardwalk.

27. The method of claim 8, further comprising the step of simulating a carnival.

28. The method of claim 8, further comprising the step of simulating a boardwalk.

29. The computer-readable medium of claim 15, further comprising instructions for causing the computer system to execute the step of simulating a carnival.

30. The computer-readable medium of claim 15, further comprising instructions for causing the computer system to execute the step of simulating a boardwalk.

31. The method of claim 22, further comprising the step of simulating a carnival.

32. The method of claim 22, further comprising the step of simulating a boardwalk.

33. A system for creating multiple custom themed virtual environments, comprising:
a plurality of remote computer systems in communication with a central computer system, each remote computer system being operated by a user;
the central computer system executing a themed virtual environment creation module for allowing a user to create a themed virtual environment, the themed virtual environment creation module allowing a user to:
select a template virtual environment and a plurality of primitives to be placed in the virtual environment;
define one or more attributes associated with the primitives;
provide areas for indicia to be applied to the plurality of primitives;
customize the plurality of primitives by applying the indicia to the primitives when received from remote computer systems;
create customizable avatars for use in the template virtual environment;
customize the template virtual environment by placing the plurality of primitives at desired locations in the template virtual environment;
interact with a user interface tool to specify grid attributes, display maps, and define paths;
provide different sets of indicia to the plurality of primitives placed in the virtual environment to customize the template virtual environment;
the plurality of remote computer systems providing for creation of different themed virtual environments by allowing for the customization of the indicia of the template virtual environment;
a plurality of separate remote computer systems for accessing at least one of the themed virtual environments created on one of the plurality of remote computer systems;
wherein a user on at least one of the plurality of separate remote computer systems can upload a separate set of indicia on the at least one of the themed virtual environments created on one of the plurality of remote computer systems;
wherein the at least one of the themed virtual environments created on one of the plurality of remote computer systems can include a plurality of avatars created on the plurality of remote computer systems, the avatars interacting with one another in the separate themed virtual environment.

34. The system of claim 33, wherein the indicia comprises a company name or company logo, and the company name or company logo is applied to the plurality of primitives by the themed virtual environment creation module.

35. The system of claim 33, wherein the themed virtual environment creation module allows a client to identify one or more games associated with the plurality of primitives.

36. The system of claim 33, wherein the real-world environment is a carnival.

37. The system of claim 33, wherein the real-world environment is a boardwalk.

38. The system of claim 33, wherein the virtual environment is accessible by a separate social media networking environment and wherein the virtual environment is presented to a user of the separate social media networking environment within at least a portion of a user interface of the separate social media networking environment.

* * * * *